Dec. 22, 1970   S. K. ROY   3,548,634
PERMEABILITY CELL

Filed Aug. 5, 1968   2 Sheets-Sheet 1

INVENTOR.
BY SALIL K. ROY

United States Patent Office 3,548,634
Patented Dec. 22, 1970

3,548,634
PERMEABILITY CELL
Salil K. Roy, New Brunswick, N.J., assignor to American Standard Inc., New York, N.Y., a corporation of Delaware
Filed Aug. 5, 1968, Ser. No. 750,148
Int. Cl. G01n 15/08
U.S. Cl. 73—38
10 Claims

ABSTRACT OF THE DISCLOSURE

In this invention a method and structure is disclosed for determining pore characteristics of a porous structure wherein one surface of the porous structure is subjected to a gas under pressure, the differential of gas pressure across said porous structure is measured, and the flow of gas through the porous structure be determinable, the pressure differential and flow information being used to determine the characteristics of the porous structure.

---

This invention relates generally to measurements of permeability and more specifically to structure and method of determining pore size, capillary volume, surface area distribution of porosity, volume-size distribution of porosity, and moisture-stress distribution of a porous structure.

A determination of permeability is important when working with porous ceramics. A knowledge of the permeability of dry and wet specimens permits the calculation of pore sizes. Pore size distribution information makes it possible to estimate the surface area as well as moisture stress distribution of porous materials.

Higher permeation rates are obtained with larger pores. When passing gas, larger pores also result in larger bubbles and hence a smaller surface area of bubbles with a given amount of gas. However, very small pores are more susceptible to being plugged by impurities in the gas and hence, a compromise is required for most efficient use. Here again, a pore size distribution determination becomes necessary.

In a ceramic material, in most instances, pores are not usually uniform. Often, assumptions are made regarding shape; and, the situation is quite complicated due to the existence of tortuosity, inert and inactive porosity and interconnection of pores.

It is an object of this invention to provide a device which measures pores in porous creamics which are open on both sides.

It is another object of this invention to provide a device which can be used to det ermine surface area and surface area distribution of porous materials.

It is still another object of this invention to provide a device which can be used to determine moisture stress distribution of porous materials.

It is also an object of this invention to provide a new method of determining permeability, pore size, tortuosity, surface area, moisture stress and their distributions, which is quick, simple and accurate.

It is still another object of this invention to provide a device which is economical to build and reliable in operation.

It is also another object of this invention to provide a device which can characterize total porosity.

Other objects and many of the attendant advantages of this invention will be readily appreciated as the same becomes better understood by reference to the following detailed description when considered in connection with the accompanying drawing.

Figure 1:
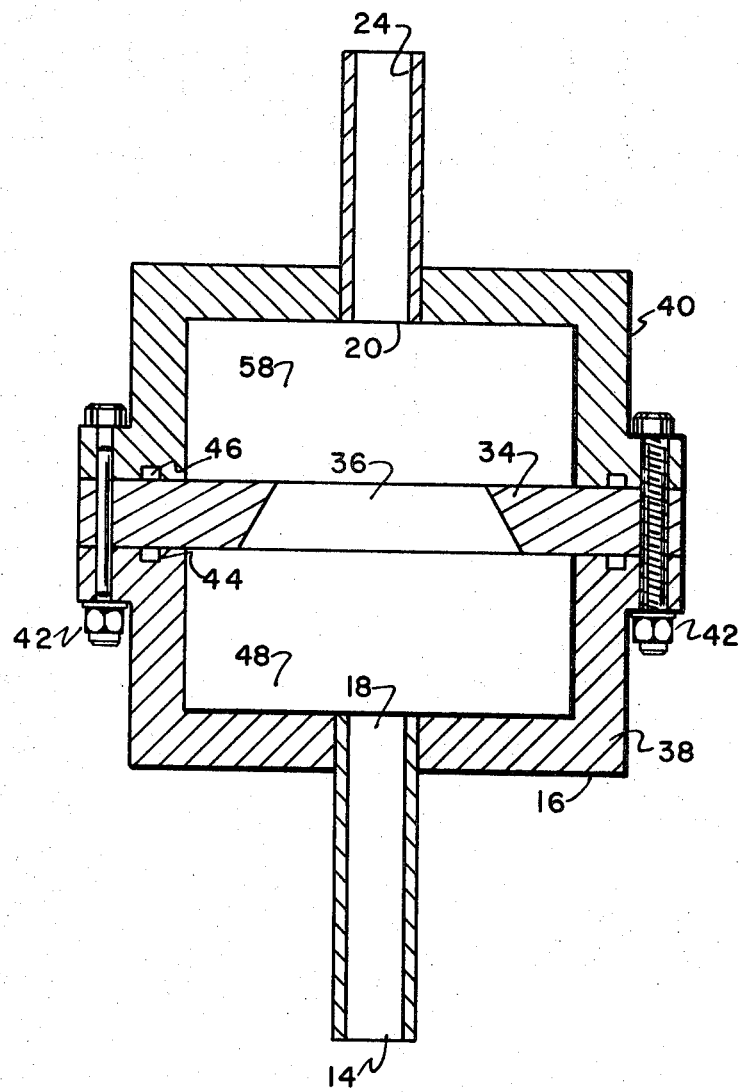
Figure 2:
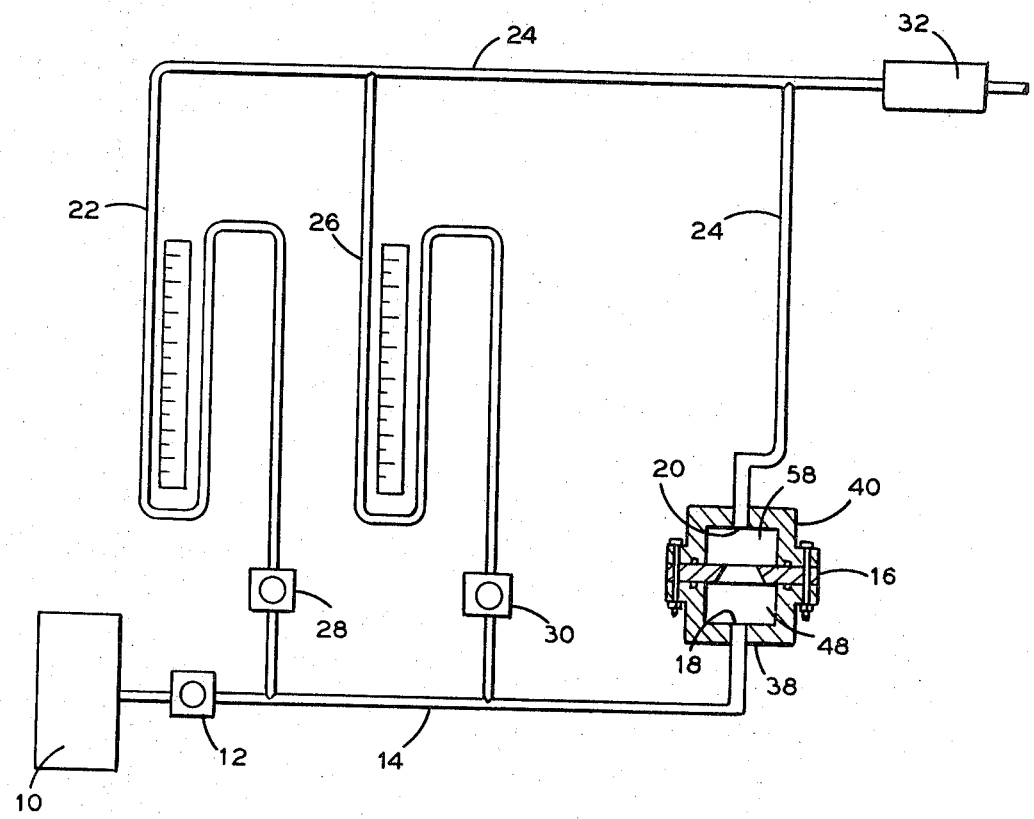

FIG. 1 is a sectional view of a sample support in accordance with the principles of this invention; and FIG. 2 is a schematic of structure in accordance with the principles of this invention.

Similar reference numbers refer to similar parts throughout the several views.

Referring to FIG. 1, there is illustrated a sectional view of a specimen retaining means 16. A centrally positioned plate 34 having a cutout 36 which can be tapered is positioned between a high pressure cover plate 38 which can be cup shaped; and a low pressure cover plate 40 which can also be cup shaped.

The assemblage of the centrally positioned plate 34, the high pressure cover plate 38 and the low pressure cover plate 40 is removably clamped together by positive but quick disconnect means such as bolts and nuts 42 or the like. O rings 44, 46 or the like are interposed between each cover plate 38, 40 and associated contacting surface of the centrally positioned plate 34 to provide a gas tight seal. The structure can be maintained in alignment by the use of two dowell pins.

The high pressure inlet port 18 is coupled to feed gas from the gas line 14 to the high pressure cavity 48 of the cover plate 38.

The low pressure outlet port 20 is coupled to permit gas to pass from the low pressure cavity 58 of the cover plate 40 to the gas line 24.

If desired, the centrally positioned plate 34 and the high and low pressure cover plates 38, 40 can be made of a transparent material such as Plexiglass or the like to permit visual observation of a sample positioned within the specimen retaining means 16 during the testing.

Referring to FIG. 2, there is illustrated a structure in accordance with the principles of the invention. A source of gas pressure 10 such as a commercially available cylinder of gas or the like is coupled to feed as through a valve 12 to a high pressure gas line 14. The valve 12 controls selectively the pressure of the gas in gas line 14 from the source of gas pressure 10. The specimen retaining means 16 has a high pressure inlet port 18 and a low pressure outlet port 20. The gas line 14 is coupled to feed gas to the high pressure inlet port 18.

A low pressure differential gas measuring means 22 such as a water manometer is coupled between the high pressure inlet port 18 through the gas line 14 and the low pressure outlet port 20 through gas line 24.

A high pressure differential gas measuring means 26 such as a mercury manometer is coupled between the high pressure inlet port 18 through the gas line 14 and the low pressure outlet port 20 through the gas line 24.

Thus, both the low and high pressure differential gas meausring means 22, 26 are connected to measure the differential of pressure in the specimen retaining means 16.

A valve 28 is interposed between the gas line 14 and the low pressure differential measuring means 22 to selectively permit or prevent the pressure of the gas in the gas line 24 from affecting the measuring means 22.

Similary, a valve 30 is interposed between the gas line 14 and the low pressure differential measuring means 26 to selectively permit or prevent the pressure of the gas in the gas line 24 from affecting the measuring means 26.

A flow meter 32 for measuring the flow rate of gas through the specimen can be coupled between the low pressure outlet port 20 through the gas line 24 and the atmosphere.

In operation, a porous sample, the permeability of which is to be determined is positioned onto the side of the centrally positioned plate 34 which faces the high pressure cover plate, the cutout 36 being sized slightly smaller than the size of the sample. By using different central pieces with different tapered holes, it is possible to test specimens of many sizes.

First, the sample, in its dry state or condition is positioned within the high pressure cavity 48 in gas tight relationship with plate 34, and the dry permeability of the sample is determined using the formula:

$$R = \frac{Q}{A} \cdot \eta \cdot \frac{h}{p} \cdot \frac{1}{t}$$

Where

R=permeability coefficient (cm.²)
Q=volume of fluid passing (cm.³) measured at the mean absolute pressure through the medium
A=surface area of test piece (cm.²)
$h$=thickness of test piece (cm.)
p=difference in pressure between the two faces of the test piece (gm./cm. sec.²)
$t$=time (sec)
$\eta$=viscosity (gm./cm. sec.)

Gas, under pressure, is fed through the high pressure inlet port 18 to the high pressure cavity 48. Manometers are provided to measure the pressure of gas in the high pressure cavity 48, the pressure of gas in the low pressure cavity 58 and the difference in pressure between the two faces of the test specimen. A flowmeter coupled to the low pressure cavity 58 provides flow rate information.

For pore size determination of a sample, both the dry and wet permeability is required. The dry permeability of the sample can be determined as just noted. Wet permeability is determined in the same manner, the only difference being that the sample is first impregnated with a fluid such as water.

There are various methods of saturating a sample with water such as soaking the sample in water at room temperature; heating the sample while in water; and first evacuating and then impregnating the sample with water at room temperature. The last noted procedure, however, appears to be very satisfactory as replacement of the air in the pores of the sample with water takes place in successive stages and maximum impregnation of the sample with water is possible.

In the last mentioned procedure, the sample is placed into an evacuation chamber at a pressure of only a few microns for approximately one hour. All the air from the pores of the sample is thus removed. While the sample is still under vacuum, distilled water is poured onto and covers completely the sample. The vacuum is then released and the sample is left immersed for a time sufficient to permit it to become impregnated with the water. A few minutes was found to be adequate.

The water impregnated sample is mounted onto the centrally positioned plate 34 within the high pressure chamber 48 in a gas tight manner by means of clay, wax or the like. The specimen retaining means 16 is assembled, the low and high pressure cover plate are positioned on each side of the centrally positioned plate 34 and the specimen retaining means 16 is made gas tight by securing the clamping means such as the bolts and nuts 42.

To determine pore sizes, the permeability of air through the sample which has been saturated with water is also measured as a function of differential pressures, i.e., the difference of pressure between the entrance and the exit side of the sample.

The pressure is increased to the high pressure inlet port 18 or entrance side of the sample until air is first observed passing through the sample. A sensitive flowmeter or the presence of a bubble on the low pressure side of the sample will indicate the start of air flow. At this instant, the largest of the saturated pores of the sample have been opened and are clear of water; and, air flows through the largest pores of the sample. The pressure of the gas to the sample is then increased in determinable increments, and the flow rate of gas through the sample is measured. A curve of gas flow rate vs. pressure differential can be drawn as the data is obtained. Depending upon the nature of the specimen, different gas flow rate vs. pressure differential curves can be obtained.

In determining the pore sizes of a porous specimen or sample, if it is assumed that the pores are cylinders of uniform diameters oriented parallel to the direction of gas flow and using the equation $$D = \frac{4\gamma \cos \theta}{p}$$

which correlates pressure required to overcome the capillary forces which hold water in the pores to the pore size, where D=diameter of capillary
p=pressure of gas
$\gamma$=surface tension of the liquid
$\theta$=angle of contact the largest, smallest and equivalent pore sizes can be obtained.

When gas first begins to flow through the sample, the largest diameter pores of the sample are cleared of water and are opened. The minimum or smallest pore size is represented by the pressure differential which occurs after the slope of the flow rate vs. pressure differential curve becomes constant and parallel to that of the sample when dry. The curve of the sample when dry is obtained by placing the sample into the holder 16 before it is saturated with water and taking reading. The equivalent pore size obtained by extrapolation gives the size of a theoretical sample or specimen within which the pores are uniform cylinders of one size oriented parallel to the direction of flow.

In addition to obtaining the maximum, minimum and equivalent pore size, a determination of the number of capillaries included between given diameters can be made from the flow rate vs. pressure differential curves.

From the number vs. size distribution of pores it is possible to determine the total surface area and/or surface area distribution of porosity.

It is also possible utilizing this cell to determine the volume-size distribution of porosity from the number-size distribution or the surface area-size distribution.

It is also possible using this cell to determine the moisture-stress distribution from the pore size-pore volume distribution, comparison of permeation rates through different porous specimens, and for determining absolute permeation.

Obviously, many modifications and variations of the present invention are possible in the light of the above teachings. It is, therefore, to be understood that the invention may be practiced otherwise than as specifically described.

What is claimed is:

1. A method of determining the wet permeability of a porous structure comprising filling the pores of said porous structure with a fluid, applying a gas under pressure to one surface of said structure, measuring the pressure differential of said gas across said porous structure, measuring the flow rate of gas through said porous structure for various pressure differentials, and determining the wet permeability of said porous structure for said measured pressures and flows.

2. The method of claim 1 wherein said fluid in said pores comprises water.

3. The method of claim 2 wherein a flowmeter is coupled for measuring the flow rate of gas through said porous structure.:

4. The method of claim 3 wherein manometers are coupled for measuring the pressure differential of the gas across the porous structure.

5. Method of determining the largest pore size of a porous structure comprising filling the pores of said porous structure with a fluid, applying a gas under pressure to one surface of said structure, measuring the flow rate of gas through said porous structure, measuring the pressure differential of said gas across said porous structure when gas first begins to flow through said porous structure, and determining the largest pore size of the porous structure according to the formula $$D = \frac{4\gamma \cos \theta}{p}$$

where
- D = diameter of pore size
- p = presure of gas
- γ = surface tension of the liquid, and
- θ = angle of contract.

6. The method of claim 5 wherein said fluid in said porous structure comprises water.

7. The method of claim 6 wherein a flowmeter is coupled for measuring the flow of gas through said porous structure.

8. The method of claim 7 wherein manometers are coupled for measuring the pressure differential of the gas across the porous structure.

9. Method of determining the smallest pore size of a porous structure comprising filling the pores of said porous structure with a fluid, applying a gas under pressure to one surface of said structure, measuring the flow rate of gas through said porous structure, measuring the pressure differential of said gas across said porous structure when the slope of the flow rate vs. pressure differential curve becomes constant and parallel to that of the porous structure when dry, and determining the smallest pore size of the porous structure according to the formula $$D = \frac{4\gamma \cos \theta}{p}$$

where
- D = diameter of pore size
- p = pressure of gas
- γ = surface tension of the liquid, and
- θ = angle of contact.

10. The method of claim 9 wherein said fluid in said porous structure comprises water.

References Cited

UNITED STATES PATENTS

| | | | |
|---|---|---|---|
| 2,539,355 | 1/1951 | Reichertz | 73—38 |
| 2,737,804 | 3/1956 | Herzog et al. | 73—38 |
| 2,861,451 | 11/1958 | Emmons III | 73—38 |
| 3,349,619 | 10/1967 | Millar | 73—205 |

LOUIS R. PRINCE, Primary Examiner

W. A. HENRY, II, Assistant Examiner